Aug. 6, 1957 R. R. RANEY ET AL 2,801,863
FLEXIBLE FRAME CONSTRUCTION FOR VEHICLE RUNNING GEAR
Filed March 15, 1955 4 Sheets-Sheet 1
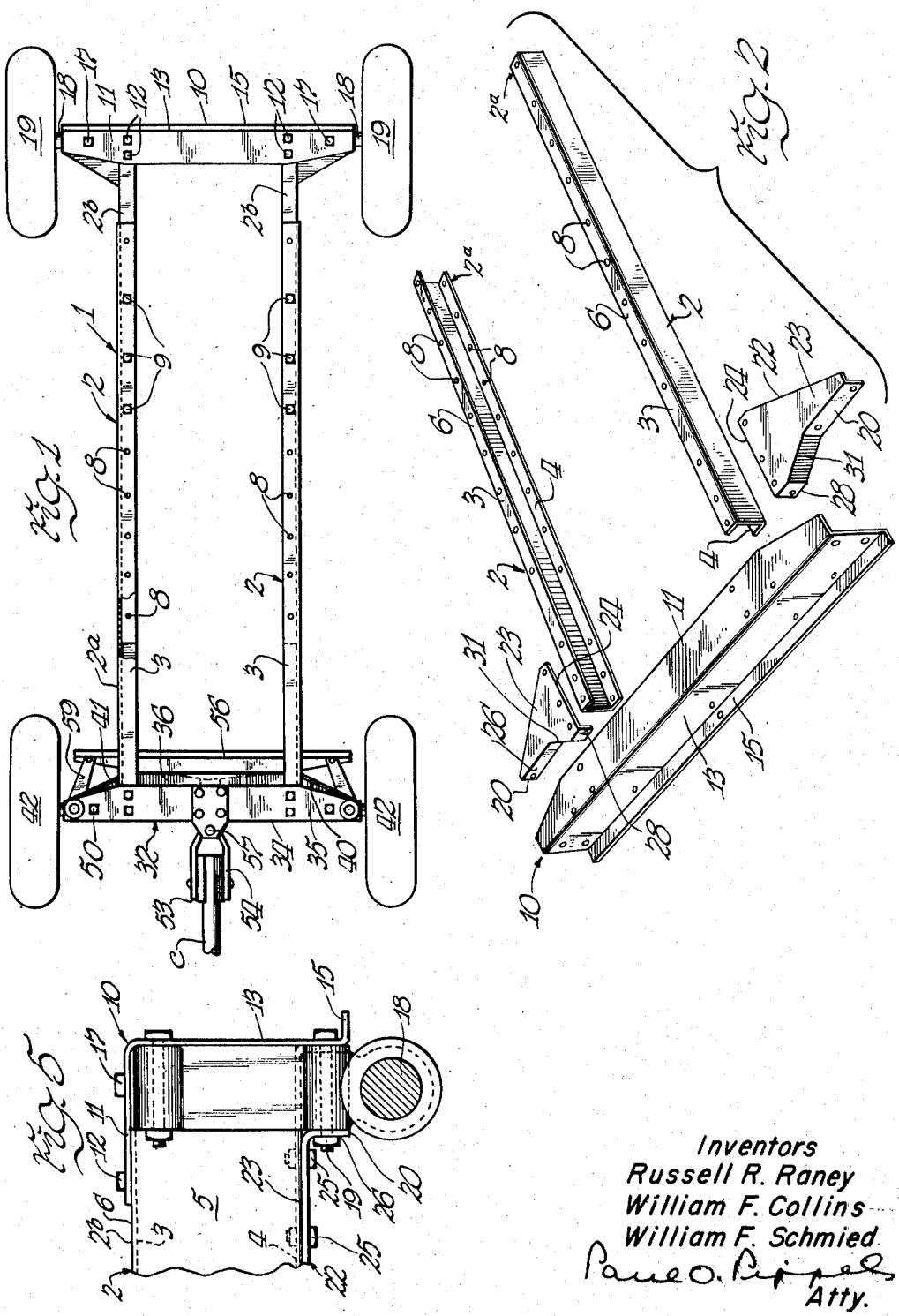
Inventors
Russell R. Raney
William F. Collins
William F. Schmied
Atty.

Aug. 6, 1957  R. R. RANEY ET AL  2,801,863
FLEXIBLE FRAME CONSTRUCTION FOR VEHICLE RUNNING GEAR
Filed March 15, 1955  4 Sheets-Sheet 2
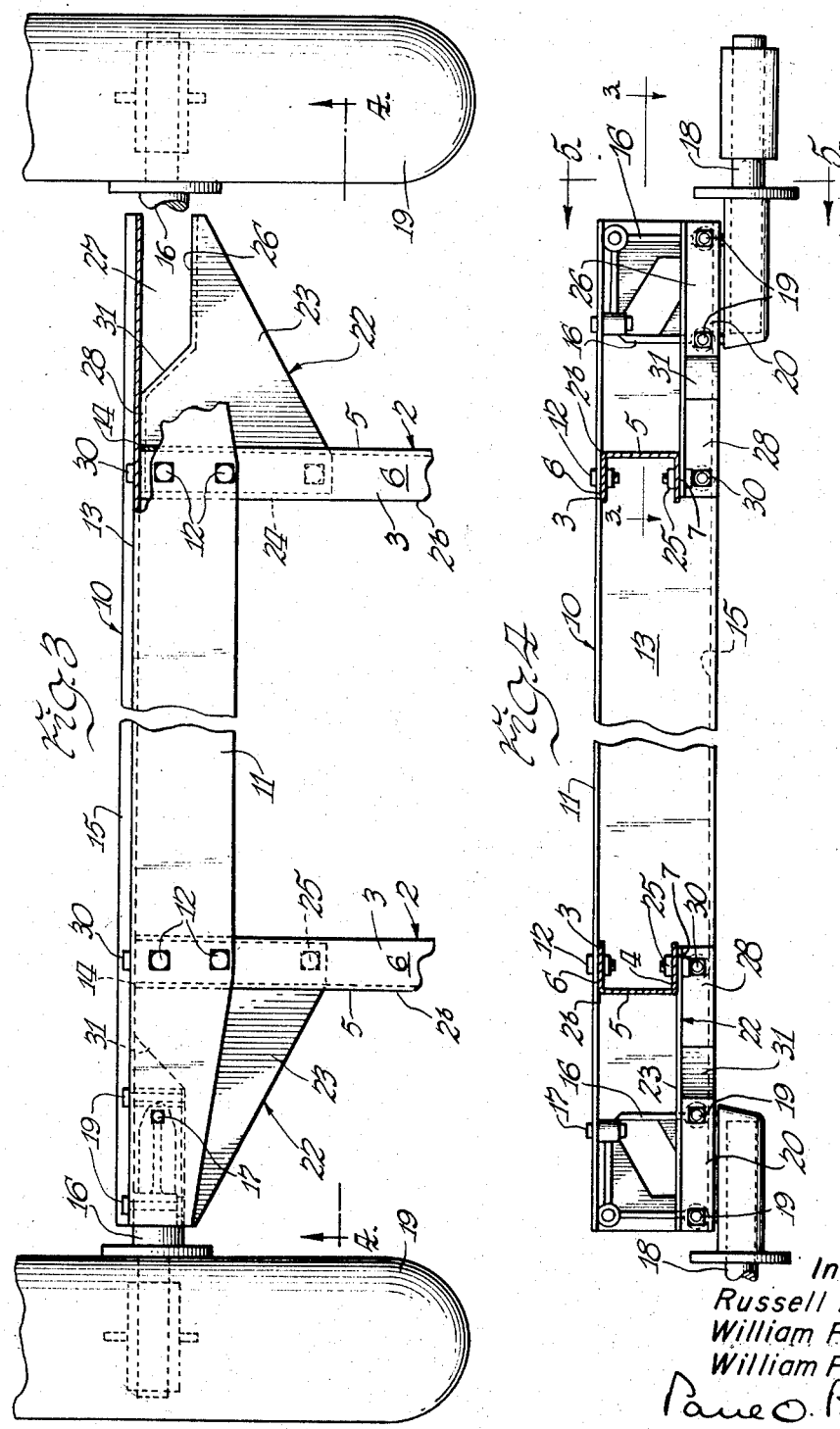
Inventors
Russell R. Raney
William F. Collins
William F. Schmied
Atty.

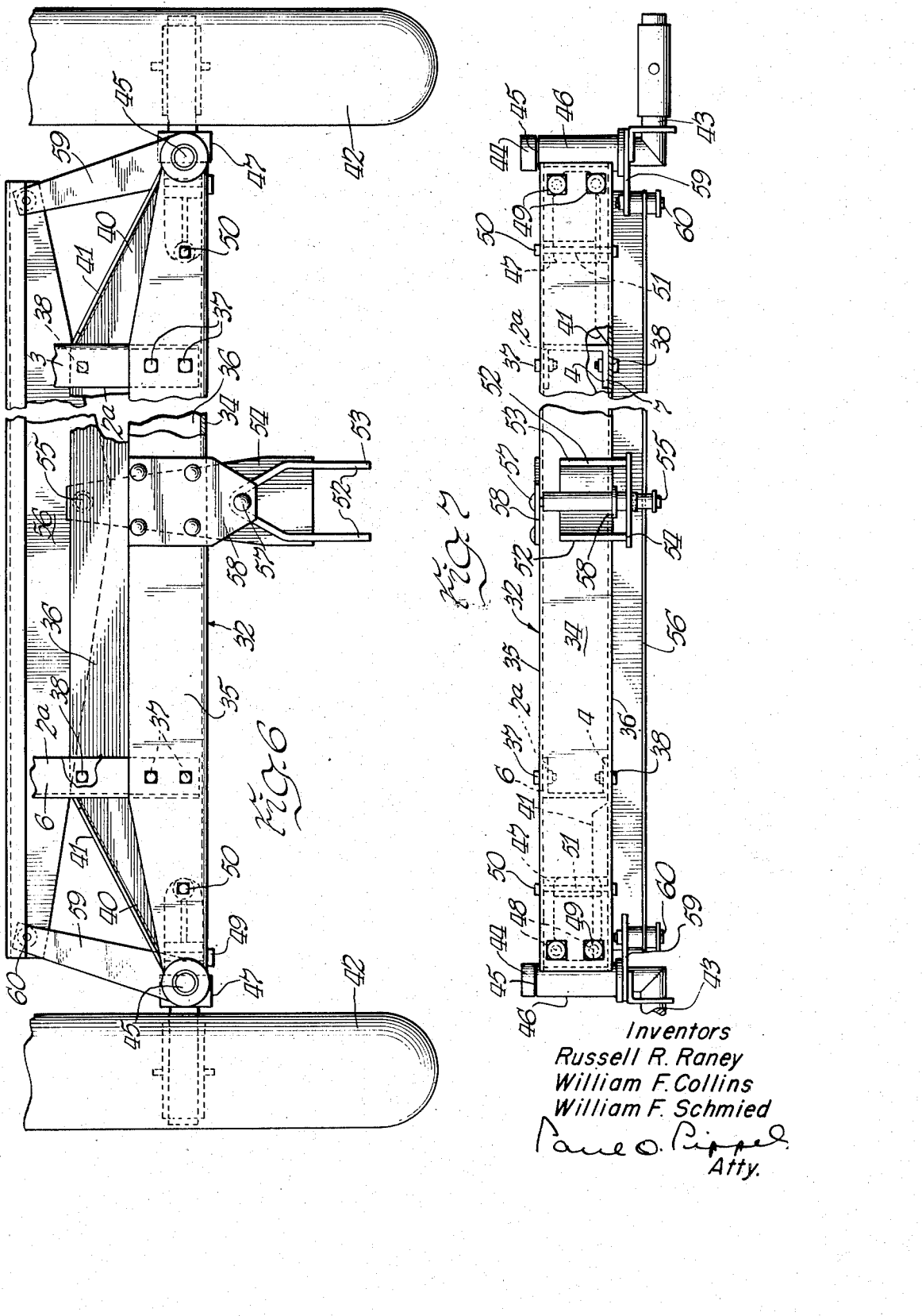

Aug. 6, 1957 R. R. RANEY ET AL 2,801,863
FLEXIBLE FRAME CONSTRUCTION FOR VEHICLE RUNNING GEAR
Filed March 15, 1955 4 Sheets-Sheet 4
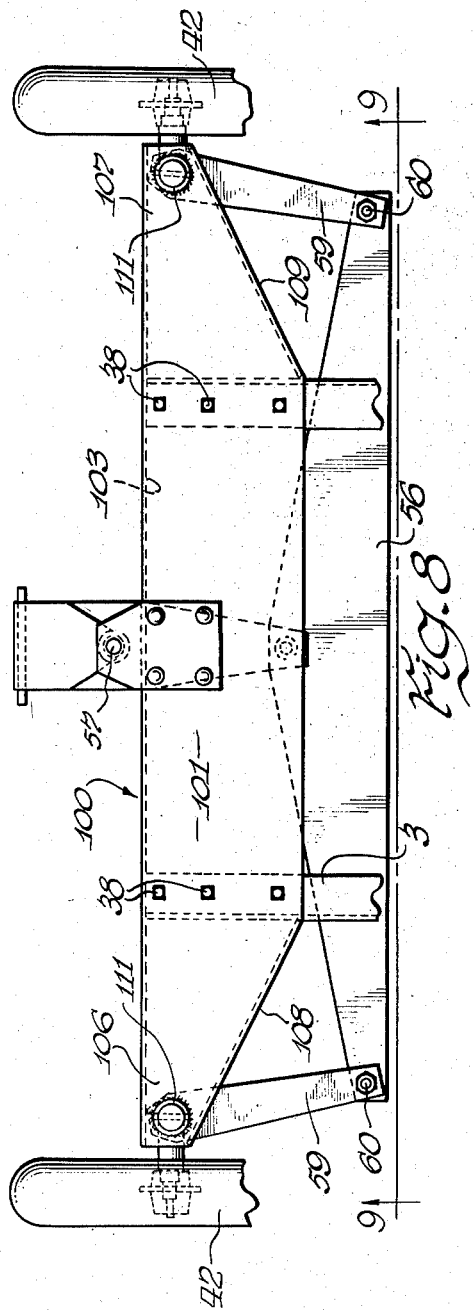
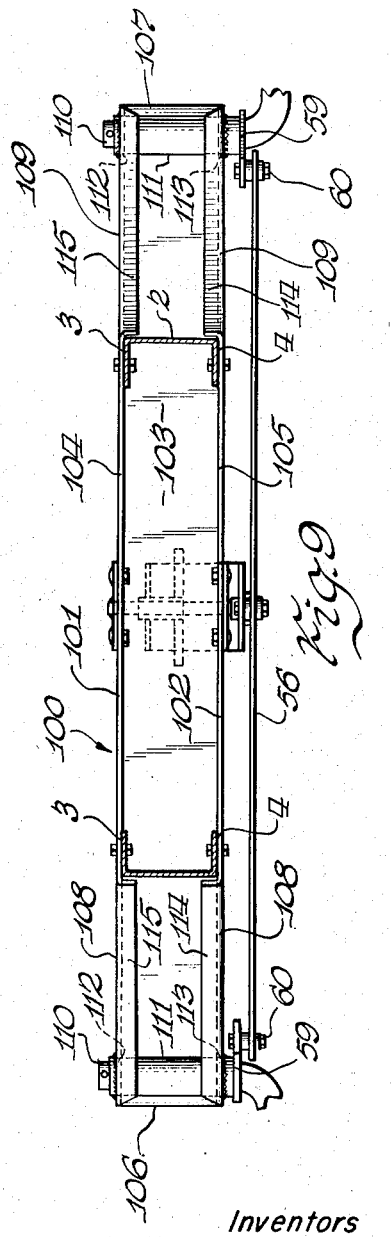
Inventors
Russell R. Raney
William F. Collins
William F. Schmied
Atty.

United States Patent Office 2,801,863
Patented Aug. 6, 1957

2,801,863

FLEXIBLE FRAME CONSTRUCTION FOR VEHICLE RUNNING GEAR

Russell R. Raney, Western Springs, William F. Collins, Downers Grove, and William F. Schmied, Blue Island, Ill., assignors to International Harvester Company, a corporation of New Jersey Application March 15, 1955, Serial No. 494,330

22 Claims. (Cl. 280—106)

This invention relates to a new and improved running gear for a farm wagon or the like and is an improvement on a companion application of Russell R. Raney for Power Farm Wagon, Serial No. 187,469, filed September 29, 1950, and now U. S. Patent No. 2,669, 461. This application is a continuation-in-part of our U. S. application Serial No. 330,478, filed January 9, 1953, for Flexible Frame Construction for Vehicle Running Gear, and now abandoned.

One object of the invention is to provide a novel flexible running gear for a vehicle such as for example a farm wagon incorporating a flexible chassis construction having a front bolster beam which is made exceptionally rigid and side sills and a rear bolster beam which are relatively more flexible, whereby the rigid front bolster beam maintains steering stability of the front wheels mounted thereon and the side sills and the rear axle beam accommodate torsional flexing so as to permit the vehicle to follow the terrain over which it traverses and thus hug the ground.

A more specific object of one embodiment of the invention is to provide a novel running gear incorporating a chassis having transverse front and rear axle beams and longitudinal interconnecting side sills, the front axle beam being formed of U-section and having novel end contours to provide an extremely stiff front axle bolster, the side sills being of U-channel and connected only at the front and rear ends thereof to the front and rear axle beams whereby the side sills are accommodated extreme torsional flexibility, and the rear axle beam being of Z-shaped section and so designed as to resist transverse flexing by vertical loads but more readily accommodating torsional flexing in order to permit up and down movements of the rear wheels relative to each other as they traverse uneven terrain.

A further object of the invention is to devise the front bolster beam with a novel simple flange contour at its ends such as will substantially improve the rigidity of the end portions without a material addition in cost and without reducing the flexibility of the side sill beam members.

Another object of the invention is to devise a novel connection between the rear wheel mountings and the side sills as well as the rear axle beam so as to rigidify the end portions of the rear axle beam and obtain an efficient connection to the adjacent side sill member such as will transmit the loads to the side sill members during lateral deflection of the chassis and without disturbing the flexibility of the intermediate portion of the rear axle beam between the side sills.

A still further object of the invention is to provide a simple, rugged trailer vehicle such as will utilize common channel sections which have been modified in minimum manner but at critical and strategic areas consistent with the achievement of the foregoing objects of the invention.

A further object of the invention is to provide a bolster having novel end portions with sections arranged so as to develop exceptional torsional rigidity and minimum deflection to bending.

These and other objects of the invention will become more apparent from the specification and in the drawings wherein:

Figure 1 is a plan view of the novel running gear.

Figure 2 is an exploded perspective view of the rear axle bolster, connecting brackets and side sill members.

Figure 3 is an enlarged fragmentary plan view of the rear axle bolster partly in horizontal section taken substantially on the line 3—3 of Figure 4 with parts removed in order to clarify the illustration.

Figure 4 is a vertical cross-sectional view taken substantially on the line 4—4 of Figure 3, the wheels being omitted.

Figure 5 is an enlarged fragmentary sectional view taken supstantially on the line 5—5 of Figure 4.

Figure 6 is an enlarged plan view of the front bolster beam and associated steering wheels and linkage.

Figure 7 is a front view of the front bolster beam and structure seen in Figure 6, and Figures 8 and 9 illustrate a modification, Figure 8 being a fragmentary plan view of the front bolster and Figure 9 being a sectional view on line 9—9 of Figure 8.

Describing the invention in detail, the wagon running gear or under carriage structure generally indicated 1 is adapted to have a platform, wagon or other cargo carrying structure (not shown) mounted directly thereupon, the carrying structure being such as a flexible steel box or the like. The wagon running gear or chassis 1 comprises a pair of transversely spaced longitudinally extending horizontal side sill members generally indicated 2, 2 which are channel or U-shaped in cross section and each comprises inwardly extending top and bottom webs 3 and 4 and a substantially vertical outboard web 5 interconnecting the horizontal top and bottom webs 3 and 4. The webs 3 and 4 provide an upper surface 6 and a lower surface 7 respectively. These side sill members 2, 2 each comprises a pair of longitudinally telescoping front and rear channel extension or sections 2a and 2b and these may be extended to lengthen the chassis or they may be telescoped to shorten the chassis. It will be noted that the top and bottom webs 3 and 4 of the respective sections 2a and 2b are each provided with a series of registering holes 8, 8 through which are adapted to be passed bolts 9, 9 for fastening the sections to each other. It will be noted that when the side sills are short they are doubled throughout substantially their entire lengths so that they are relatively more rigid than when these side sills are extended. This feature obtains the requisite flexibility necessary for an extremely long wagon and the rigidity for the short wagon.

The rear ends of the rear sections 2b, 2b of the side sill members 2, 2 are interconnected by a transverse rear axle beam member 10 Z-shaped in cross section and providing a forwardly extending generally horizontal top web or flange 11 which extends over and seats on the top surfaces 6 of the respective rear end sections 2b of the side sills, 2, 2 and connected to the top webs 3 thereof as by bolts 12, 12. The bolster member 10 comprises a substantially vertical rear wall or web 13 which extends downwardly from the rear margin of the top web 11 and on its forward side seats as at 14 against the rear ends of the rear end portions of the sections 2b, 2b of the side sills as best seen in Figure 3. The rear web 13 extends below the lower faces 7 of the bottom flanges 4 of the sill members 2, 2 and at its lower edge emerges into the forward edge of a rearwardly extending generally horizontal flange 15 which is extremely narrow as compared with the top wall 11. The function of the flange 15 is to rigidify the bolster member 10 against vertical transverse flexing while accommodating torsional deflection with comparative ease. It will be understood that all the beams in the running gear are fashioned from steel plates and, of course, are flexible within reasonable limits without taking permanent set.

Each end of the rear axle beam 10 confines outwardly of the related sill 2 in spaced relationship thereto a rear wheel supporting member 16 which is seated against the forward side of the web 13 and the underside of the top web 11 and fastened thereto as by bolt 17. Each member 16 incorporates an outwardly extending spindle 18 which carries a wheel 19 thereupon. Each member 16 extends to the lower margin of the wall 13 of the rear axle bolster 10 and is secured to the rear wall 13 by means of a pair of bolts 19, 19 passing through appropriate openings in the wall 13 and in the member 16, these bolts also passing through the forward side of the member 16 and through a depending flange 20 of a gusset or truss bracket 22, said flange 20 being disposed along the rear margin of the bracket structure 22 and the bracket comprising a generally horizontal top gusset plate 23 extending forwardly from the flange and along its one or inboard edge 24 underlining the bottom face 7 of the adjacent rear section 2b of the related sill and fastened thereto by means of bolts 25 connecting the bottom flanges 4 and the plate portion 23. It will be seen that the flange 20 comprises an outboard portion 26 which extends generally parallel to the wall 13 and defines a slot 27 (Figure 3) therewith, whereby to admit the related member 16 between the same and the wall 13 for snug confinement therebetween. The flange portion 26, inboardly of the member 16, is angled rearwardly and extends obliquely to the wall 13 to provide an intermediate flange portion 31 followed by an inboard flange portion 28 which parallels and abuts against the forward side of the wall 13 and extends from a region a substantial distance outboardly of the related side sill member 2 to therebeneath and projects with the inboard edge 24 to adjacent the inboard edge of the side sill 2. Thus it will be seen that the flange portion 28 is disposed in rigidifying relationship to the connection of the rear end of each side sill 2 with the web 13 by means of a bolt 30 which passes through the wall 13 and the flange portion 28 in an area immediately beneath the end portion of the related side sill beam 2. The continuity of the flange 20 and the diagonal portion 31 obtains extreme longitudinal rigidity throughout the entire length of the bracket 22, that is transversely of the chassis, and the disposition of the portions 31 insures transverse rigidity and resists torsional flexing.

The forward end portions of the forward sections 2a, 2a of the side sills 2, 2 are interconnected by means of a front bolster member 32 which comprises a U-channel section member including a forward substantially vertical wall 34 and rearwardly extending substantially horizontal top and bottom flanges or walls 35 and 36, the top wall 35 being of relatively narrow width as compared with the bottom wall 36 which is substantially about twice as wide as the top wall. The top wall 35 seats on its underside against the top surface 6 of the related side sill portion 2a and is connected to the top flange 3 thereof as by bolts 37. The top wall is angled at the end portions forwardly and outwardly in converging relation to the front wall. The bottom wall 36 underlies the forward end portions of the sections 2a, 2a of the side sill members and on its top side seats against the bottom surfaces 7 thereof and is connected by means of a series of bolts 38, 38 to the flange thereof. It will be seen that the rear margin or edge of the bottom wall 36 of the front bolster beam outboardly of the side sills 2, 2 is angled forwardly so as to provide outwardly tapered end portions 40, 40 and the rear margins of these end portions are each formed with an upstanding flange 41, each flange 41 extending from adjacent to the related sill member 2a to adjacent the outboard extremity of the end portion 40 and developing with the adjacent channel portions an extremely rigid section.

A pair of front steering wheels 42, 42 are positioned outwardly of the terminal ends 40, 40 of the front axle beam 32 and are journaled for rotation upon horizontal leg portions 43, 43 of L-shaped steering spindles 44, 44 the vertical leg portions 45, 45 of which are journaled in sleeves 46, 46 which are integrally a part of wheel support members generally designated 47, 47. Each wheel supporting member 47 has a pair of horizontal bosses 48, 48 adapted to abut against the back side of the web portion 34 and be rigidly connected thereto by means of bolts 49. Each wheel supporting member 47 extends snugly between the top and bottom webs 35 and 36 and is fastened thereto as by a bolt 50 passing through a vertically disposed bore 51 formed in each member 47 and aligned apertures in the webs 35 and 36.

The wagon running gear is connected to the tractor or other draft means by a coupling bar C. The coupling bar has one end pivotally connected between the pair of vertically disposed plates 52, 52 of a substantially U-shaped hitch member 53. The lower marginal edge of each plate 52 is welded to a horizontally disposed rearwardly extending plate 54 which passes beneath the front axle beam 32 and has its rear end pivotally connected as at 55 to approximately the center of the transversely disposed transverse rod or bar 56. The plate 54 intermediate its ends is pivoted on a substantially vertical axis by means of a bolt 57 passing therethrough and connected to vertically spaced brackets 58, 58 fastened to and projecting forwardly from the top and bottom webs 35 and 36. The vertical leg portion 44 of each wheel spindle is connected to the forward end of a steering arm 59, which, at its rear end is pivoted as at 60 to the adjacent end of the tie bar 56. It will be apparent that rotation of the plate member 54 and the hitch will effect steering of the wheels 42 through the linkage 56, 59.

It will be noted that the rear edge of the top web 35 of the front bolster at each end portion 40 is angled forwardly and that the forward angling of the rear edges of the bottom web end portions accommodates angling of the front wheels to obtain a small turning radius.

It will be readily appreciated that an extremely rigid front bolster beam is obtained such as will resist deflection and will thereby maintain steering stability and that the rear axle beam is relatively less rigid and therefore more flexible to both torsional as well as transverse deflection so that the wagon may twist about its longitudinal axis whereby the wheels will always engage the ground to provide a road hugging wagon.

Describing the embodiment of Figures 8 and 9, wherein parts identical with those of Figures 1 through 7 are identified by corresponding reference numerals, the front bolster indicated 100 is of channel or U-shape and includes the top and bottom generally horizontal webs or walls 101 and 102 of substantially the same great width and at their forward edges are connected with the top and bottom edges of the substantially vertical front wall 103. The top and bottom walls are interconnected with the top and bottom webs 3 and 4 of the side sill members 2 as by the bolts 38.

The present embodiment differs over the previous embodiment in that not only are the top and bottom webs of equally great width but also that the rear marginal edges 104 and 105 of the top and bottom webs 101 and 102 are sheared at the end portions 106 and 107 to provide outwardly and forwardly converging edges 108 and 109, respectively, for accommodating full turning of the related wheels 42 as determined by operation of the steering linkage 56, 59 which is attached through its arms 59 to the spindles 110 which are slightly modified over the construction shown in the previous embodiment and these spindles extending through vertically positioned sleeves 111 disposed at the outer ends of the respective end portions 106 and 107 through registering apertures 112, 113 in the top and bottom webs 101 and 102 and weld connected thereto about these openings.

As in the previous embodiment the bottom web 102 is provided along the edges 108 and 109 of the end portions 106 and 107 with upturned flanges 114 which parallel the respective edges 108 or 109 and the diagonal disposition thereof strengthening the end portion not only in a lengthwise direction of the bolster but also in a transverse direction which is extremely conducive to resisting bending as well as torsional deflection. The top web along the edges 108 and 109 of the end portions 106 and 107 is also provided with a depending flange 115 which also strengthens the end portions not only lengthwise but transversely of the bolster member.

In actual practice this construction has been found to substantially increase the rigidity of these end portions and to develop strength not only against vertical bending but also against torsion far superior to that normally developed by the ordinary square or rectangular box section.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptations as fall within the spirit and scope of the invention as defined in the appended claims.

What is claimed is:

1. In a vehicle running gear, a pair of laterally spaced side sill members, a transverse front axle bolster comprising a substantially vertical front wall and rearwardly extending substantially horizontal top and bottom webs receiving corresponding ends of said side sill members therebetween and connected thereto, said bolster having end portions extending outboardly of said side sills, front wheel mounting means disposed in said end portions and connected to said webs, at least one of said webs having outboardly of said sills rear edge portions angled in horizontally converging relationship to said front wall toward respective ends thereof, and an integral generally vertical flange on said edge portions only extending generally parallel therewith from the adjacent sill member to the related end of the beam in converging relation thereto toward the adjacent end of the beam and in transverse and longitudinal rigidifying relationship to the respective end portion and said flange extending the major portion of the width of the related web.

2. The invention according to claim 1 wherein both of said webs have said rear edge portions outboardly of said sills angled in horizontally converging relationship to said front wall toward respective ends thereof, and said top web having depending flanges along respective edge portions and said bottom web having upstanding flanges along respective edge portions and said flanges each angled toward the front wall in an outward direction and rigidifying the adjacent portion of the related web longitudinally and transversely.

3. A wheel supporting structure for a wagon running gear having a pair of transversely spaced, longitudinal sill members and a transverse axle beam comprising a generally vertical wall extending across one of the ends of said sill members and having spaced generally horizontal top and bottom webs receiving the adjacent ends of said sill members therebetween, means connecting said sill members with said beam, at least one of said webs being substantially wider than said vertical wall, said beam having end portions projecting outboardly of said sills, said one web at each end portion having an edge remote from said wall extending diagonally in converging relationship to the wall in a direction toward the adjacent end of the beam, a generally vertical flange integral with said one web along said edge at each end portion and extending from the adjacent sill to proximate the adjacent end of the beam in rigidifying relationship to the associated end portion, and wheel-spindle-mounting structures disposed in each end portion and connected thereto.

4. In a vehicle running gear having a chassis including a pair of laterally spaced channel-shaped sill members each having spaced inwardly extending top and bottom flanges and an outboard interconnecting wall, a channel-shaped front axle beam having a front wall and spaced top and bottom webs receiving one end of each sill member therebetween and secured, respectively to the top and bottom flanges thereof, a rear axle beam having a Z-vertical cross section including a vertical wall extending across the opposite ends of said sill members and further having a top forwardly extending web overlying said top flanges of said sill members and connected therewith, a rearwardly extending horizontal flange strip along the bottom of said wall of the rear axle beam, said flange strip being substantially narrower than said top web of the rear axle beam, at least one of said webs of said front axle beam being substantially broader than said one wall thereof and the front axle beam being substantially more rigid than the rear axle beam intermediate said sill members and said sill members and rear axle beam being torsionally deflectable without substantial deflection of the front axle beam.

5. In a vehicle running gear, transverse front and rear axle beams, a pair of laterally spaced sills of substantially greater length than said beams extending therebetween and connected at opposite ends thereto, said rear axle beam having end portions projecting outwardly of the sills, rear wheels supporting means connected to each end portion, and means connecting each of said rear wheels supporting means to the adjacent sills, said last mentioned means and rear axle beam being connected to respective sills at areas spaced and aligned transversely thereof in rigidifying relationship to the related rear wheel supporting means with the associated sill, said rear axle beam being being substantially less rigid intermediate said sills than said front axle beam to permit torsional flexing of the former with said sills during traverse of the running gear over uneven terrain without substantial deflection of said front axle beam to maintain steering stability of the wheels carried thereby.

6. In a vehicle running gear, a pair of laterally spaced side sill members, a transverse front axle bolster comprising a substantially vertical front wall and rearwardly extending substantially horizontal top and bottom webs receiving corresponding ends of said side sill members therebetween and connected thereto, said bolster having end portions extending outboardly of said side sills, front wheel mounting means disposed in said end portions and connected to said webs, said bottom web being substantially wider than said top web and extending beneath said sill members rearwardly of the rear margin of said top web, said bottom web outboardly of said sills having a rear edge portion angled in horizontally converging relationship to said front wall toward respective ends thereof, and an integral generally vertical flange on said edge portions extending generally parallel therewith from the adjacent sill member to the related end of the beam in rigidifying relationship to the respective end portion.

7. A rear wheel supporting structure for a wagon running gear having a pair of transversely spaced longitudinal U-section sill members with spaced top and bottom flanges and an intermediate web therebetween, a Z-shaped, transversely extending axle beam comprising a vertical rear wall having a forward side in abutment with corresponding ends of said sill members and a rearwardly projecting narrow flange along the bottom edge of the rear wall and a forwardly projecting top web along the upper edge of the rear wall and overlying the top sides of the top flanges of the sill members and connected therewith, said beam having end portions projecting outboardly of said sill members, a gusset bracket disposed in underposed relationship to each end portion and each comprising a generally horizontal plate section having an inboard edge portion positioned beneath the bottom flange of the adjacent sill member and connected therewith, the plate section having a rear edge facing the forward side of said rear wall of the beam, a depending flange integral with the plate section along said rear edge thereof and having an outboard segment spaced forwardly from the front side of said rear wall and defining a slot therewith, a wheel-support-spindle element disposed in said slot between the outboard portion of said depending flange and said rear wall and in abutment with said top web, means connecting said element with the outboard portion of the flange and said rear wall, means connecting said element with said top web, said depending flange having an intermediate segment extending diagonally from the inboard extremity of said outboard segment toward said rear wall in transverse rigidifying relationship to the related plate to resist torsional flexing thereof, said depending flange having an inboard segment formed as a continuation of the inboard end of said intermediate segment and disposed generally parallel to said rear wall in abutment with the forward side thereof and extending to beneath the adjacent sill member, and means connecting said inboard segment of the depending flange to the rear wall in an area in vertical alignment with the adjacent sill member.

8. A rear wheel supporting structure for a wagon running gear having a pair of laterally spaced longitudinal sill members and a transverse rear axle beam comprising an upright rear wall extending across the rear ends of said sill members and a forwardly projecting generally horizontal top web overlapping corresponding ends of said sill members and connected therewith, said beam having end portions projecting outboardly of said sill members, a truss bracket beneath each end portion and comprising a generally horizontal plate having one edge secured to the underside of the adjacent sill member and having a rear edge facing toward said rear wall, an integral continuous depending flange on the rear edge of said plate, said flange having an outboard portion spaced laterally from said rear wall and defining a vertical slot therewith, a wheel-support-spindle-element positioned within the slot between the outboard portion of the flange and said rear wall and connected therewith, said flange having a continuing intermediate portion extending from the outboard portion of the flange diagonally toward said rear wall and defining the inboard margin of the slot and continuing at said rear wall into an inboard flange portion to beneath the adjacent sill member generally parallel to the rear wall and connected therewith.

9. A wheel supporting structure for a wagon running gear having a pair of transversely spaced, longitudinal sill members and a transverse axle beam comprising a generally vertical wall extending across one of the ends of said sill members and having spaced generally horizontal top and bottom webs receiving the adjacent ends of said sill members therebetween and connected therewith, said bottom web being substantially broader than said top web, said beam having end portions projecting outboardly of said sills, said bottom web at each end portion having an edge remote from said wall extending diagonally in converging relationship to the wall in a direction toward the adjacent end of the beam, a generally vertical flange integral with the bottom web along said edge at each end portion and extending from the adjacent sill to proximate the adjacent end of the beam in rigidifying relationship to the associated end portion, and wheel-spindle-mounting structures disposed in each end portion and connected with said top and bottom webs and said wall.

10. A rear wheel supporting structure for a wagon running gear having a pair of transversely spaced longitudinal sill members, a transversely extending axle beam having a vertical wall extending across the rear ends of said sill members, a horizontal web integral with the upper margin of the wall extending forwardly therefrom and overlapping and connected to the rear ends of said sill members, said beam having end portions projecting outboardly of said sills, wheel mounting means connected to said end portions, and truss gusset elements connected to said means, said wall and the adjacent end portion and each comprising a horizontal plate having one edge connected to the adjacent sill and projecting outboardly therefrom and having an edge opposing said wall with a vertical flange therealong, the vertical flange having a portion spaced from the wall and extending longitudinally of the plate and receiving said means between the same and the rear wall and connected therewith, said vertical flange having another portion buttressed against said rear wall and extending generally parallel thereto and connected therewith, and said flange having a further portion extending diagonally widthwise of said plate and merging with both of said other portions of the vertical flange in transverse and longitudinal rigidifying relationship to said plate.

11. In a vehicle running gear having a chassis including a pair of laterally spaced channel shaped sill members each having spaced inwardly extending top and bottom flanges and an outboard interconnecting wall, a channel-shaped front axle beam having a front wall and spaced top and bottom webs receiving one end of each sill member therebetween and secured, respectively to the top and bottom flanges thereof, a rear axle beam having a Z-vertical cross section including a vertical wall extending across the opposite ends of said sill members and further having a top forwardly extending web overlying said top flanges of the sill members and connected therewith, a rearwardly extending horizontal flange strip along the bottom of said wall of the rear axle beam, said flange strip being substantially narrower than said top web of the rear axle beam, said bottom web of said front axle beam being substantially broader than the top web thereof and the front axle beam being substantially more rigid than the rear axle beam intermediate said sill members and said sill members and rear axle beam being torsionally deflectable without substantial deflection of the front axle beam.

12. In a vehicle running gear comprising a pair of laterally spaced longitudinal horizontal sill members, a rear axle beam having a Z-cross section including a vertical wall having a forward side extending across one end of each sill member and a generally horizontal wall extending over an end of each sill member and connected thereto, said rear wall extending below said sill members, a rearwardly extending flange strip along the bottom edge of said wall, a horizontally disposed plate fastened to each sill member along one marginal edge and extending outwardly therefrom, the plate members each having a first depending flange portion positioned along the forward side of said wall and fastened thereto below the sill members and having a laterally outwardly extending portion presenting a second depending flange portion substantially parallel to and longitudinally spaced from said first flange portion, a wheel supporting member connected to said second flange portion and said rear axle beam, and a third flange portion extending diagonally between and integrally united with the first and second flange portions and said plate and located between the outboard side of the adjacent sill member and the inboard end of the adjacent wheel supporting member.

13. A wheel supporting structure for a wagon running gear having a pair of spaced longitudinal sill members, a U-section bolster comprising spaced top and bottom webs embracing one end of each sill member therebetween and connected thereto, a vertical wall extending across the adjacent ends of the sill members and interconnecting said webs, said webs presenting free edges remote from said wall, said bolster having end portions extending outboardly of said sills and formed as continuations of said webs and wall, each end portion having an upright flange bent from said free edge of one of said webs at each end portion and the upright flange extending a substantial portion of the width of the one web from the adjacent sill outwardly to the outer end of the related end portion and converging with the vertical wall, and wheel mounting means connected to each end portion.

14. A front wheel support structure in a wagon running gear comprising laterally spaced, longitudinal side sills and a transverse front bolster interconnecting said side sills and having end portions projected outboardly of said side sills, each end portion comprising spaced top and bottom web portions and an intervening front wall portion integral with said web portions, said web portions extending rearwardly from the front wall portion, front wheel mounting means secured in each end portion against the wall portion thereof, wheel-carrying spindles pivoted to said wheel mounting means on generally vertical axes, wheels journaled on the spindles on generally horizontal axes, said web portions of each end portion having rear marginal edges angled from the sills in converging relationship to the wall portion toward the outer extremity thereof to accommodate the adjacent wheel in turning, and generally vertical flange means on the web portion of each end portion extending along the rear marginal edge thereof from the sill to the outer end of the portion and disposed diagonally to and intersecting the longitudinal axis of the bolster in transverse and longitudinal rigidifying relationship of the related end portion only outwardly of the sill.

15. In a vehicle running gear, transverse front and rear axle beams, a pair of laterally spaced sills of substantially greater length than said beams extending therebetween and connected at opposite ends thereto, said rear axle beam having end portions projecting outwardly of the sills, rear wheels supporting means connected to each end portion, and means connecting each of said rear wheels supporting means to the adjacent sills, said rear axle beam being substantially more flexible intermediate said sills than said front axle beam to permit torsional flexing of the former with said sills during traverse of the running gear over uneven terrain without substantial deflection of said front axle beam to maintain steering stability of the wheels carried thereby.

16. In a vehicle running gear, a pair of laterally spaced side sill members, a transverse front axle bolster comprising a substantially vertical front wall and rearwardly extending substantially horizontal top and bottom webs receiving corresponding ends of said side sill members therebetween and connected thereto, said bolster having end portions extending outboardly of said side sills, front wheel mounting means disposed in said end portions and connected to said webs, one of said webs being substantially wider than said other web and extending rearwardly of the rear margin of said other web, said one web outboardly of said sills having a rear edge portion angled in horizontally converging relationship to said front wall toward respective ends thereof, and integral generally vertical flanges on said edge portion extending generally parallel therewith from the adjacent sill member to the related end of the beam in rigidifying relationship to the respective end portion.

17. In a vehicle running gear, a reach structure, transverse bolster members at opposite ends of the reach structure and connected thereto, at least one of said members having end portions extending outwardly of said reach structure and having an integral vertical wall and an integral generally horizontal wall, said horizontal wall at each end portion having an edge remote from said vertical wall with a flange bent vertically from said horizontal wall angled in a generally horizontal plane in converging relation to said vertical wall and extending from adjacent said reach structure to adjacent said outer extremity of the related end portion and intersecting the longitudinal vertical median plane of said horizontal wall, and wheel-supporting means connected to each end portion adjacent to its outer extremity and disposed on a side of said median plane opposite to said edge.

18. A bolster structure for a vehicle running gear comprising a channel shaped beam member having top and bottom webs and an interconnecting vertical wall, said beam member having end portions formed as continuations of said wall and webs, said webs at each end portion having edges remote from said wall angled in an outward direction toward the wall, and an upstanding flange on the end portions of at least one web along said edge of the end portion thereof bent therefrom and extending toward the other web and converging at an acute angle with said wall toward the adjacent outer extremity thereof, and wheel mounting means in each end portion disposed between the wall and adjacent flange and interconnected with said top and bottom webs in a columnar arrangement therewith.

19. The invention according to claim 18 wherein each web at said end portions is provided with a flange bent therefrom along said edge thereof toward the other web.

20. A vehicle running gear comprising a pair of laterally spaced channel shaped side sill members, a transverse channel bolster having top and bottom webs telescoped over the adjacent ends of the side sills and connected thereto and having a wall extending thereacross, said bolster having end portions extending outwardly of the side sills, said top and bottom webs of each end portion having edges remote from said wall arranged at an acute angle to said wall toward the adjacent outer extremity thereof, a flange on each web along said edge disposed at an acute angle to said wall and projecting vertically toward the other web and having a continuous length from the adjacent side sill to the outer extremity of the related end portion and wheel mounting means connected to each end portion adjacent to its outer extremity, and positioned immediately adjacent to said wall.

21. A bolster structure for a vehicle running gear comprising spaced top and bottom webs and an intervening wall, said webs being substantially wider than said wall, said bolster having wheel mounting end portions, each end portion being formed as continuations of said webs and wall and terminating in narrow outer extremities, said webs having edges remote from the wall, and said edges on said portions angled acutely toward the wall to the related outer extremity, at least one web of each end portion having an integral flange acutely angled toward said wall and disposed contiguous to the related edge, and wheel mounting means disposed adjacent to said narrow outer extremity between said webs and connected thereto and laterally spaced between said wall and the adjacent flange.

22. The invention according to claim 21 and one of said webs being substantially wider than the other.

References Cited in the file of this patent

UNITED STATES PATENTS

| | | |
|---|---|---|
| 875,018 | Verschave | Dec. 31, 1907 |
| 2,029,540 | Porteous | Feb. 4, 1936 |
| 2,533,485 | Lynes | Dec. 12, 1950 |
| 2,669,461 | Raney | Feb. 16, 1954 |